United States Patent

[11] 3,599,055

[72] Inventor Murray Bloom
Los Angeles, Calif.
[21] Appl. No. 778,574
[22] Filed Nov. 25, 1968
[45] Patented Aug. 10, 1971
[73] Assignee TRW Inc.
Redondo Beach, Calif.

[54] IMAGE SENSOR WITH SILICONE DIODE ARRAY
6 Claims, 2 Drawing Figs.

[52] U.S. Cl. .......... 317/234, 317/235, 313/65, 315/11
[51] Int. Cl. .......... H01l 15/00, H01l 15/02
[50] Field of Search .......... 317/235, 234; 313/65 AB

[56] References Cited
UNITED STATES PATENTS

| | | | |
|---|---|---|---|
| 3,403,284 | 9/1968 | Buck et al. | 315/11 |
| 3,463,715 | 8/1969 | Bloom | 204/192 |
| 3,392,056 | 7/1968 | Maskalick | 117/227 |

*Primary Examiner*—John W. Huckert
*Assistant Examiner*—Martin H. Edlow
*Attorneys*—Daniel T. Anderson, Gerald Singer and Alfons Valukonis

ABSTRACT: There is disclosed an image sensor of the type intended for conversion of an optical image into a series of electrical signals each of which represents in its magnitude the intensity of the picture element at a predetermined location of a sensor of a picture element on which an electron beam is impinging. The beam, of course, is scanned so as to sequentially impinge on a plurality of such sensors arranged in a pattern so that the raster or scan of the entire pattern generates a series of electrical signals representative of the entire picture.

Murray Bloom
INVENTOR

BY Donald C Keaveney
ATTORNEY

IMAGE SENSOR WITH SILICONE DIODE ARRAY

BACKGROUND OF THE INVENTION

1. Field of the Invention

This invention is in the field of electro-optical transducers suited for generation of electrical signals representative of optical images or data such that the signals may be transmitted for television or other reproduction or processing applications.

2. Description of the Prior Art

Solid-state or semiconductor image sensors which do not use electron beam scanning for picture readout have been known in the prior art. Also image sensors using electron-beam-scanning tubes wherein antimony sulfide or lead oxide (as in the vidicon or the plumbicon respectively) have been known. In both of these devices problems with respect to light sensitivity and degree of resolution or resolving power have been encountered. More recently, a device named in the trade as "the Dactron" has been described. Reference is made to an article in the magazine "Electronic Design" issue Number 6 of Volume 15 dated Mar. 15, 1967 wherein an article beginning on page 54 and continued on page 60 which is entitled, "Picturephone to Use Silicon Image Sensor" describes a silicon image sensor which is stated to represent a viable intermediate image sensor between the bulky electro-beam-scanning tubes and the beamless solid-state image sensors. In the device described a silicon substrate of N-type material has formed therein a plurality of P-type silicon islands which have been diffused into the substrate. Gold overlay electrodes form the electron-beam-receiving elements. The device is provided with a circumferential output electrode so that the circuit may be completed from the beam-generating cathode through the beam and thence through the diodes it is falling on to the substrate and thence to the output electrode which in turn would be connected to an output resistor or other utilization load and thence back to the cathode. The signal appearing across the utilization load is of course proportional to the intensity of light falling on the substrate surface and penetrating through to the individual photodiodes.

SUMMARY OF THE INVENTION

In all of the prior art devices the resolution is limited by the size of the individual sensing elements which in the last-described device is the size of the diffused circles. These are stated in the article to be 8 microns in diameter and possibly within the limits of today's technology might be reduced to 2.5 microns. Similarly the spacing between the circles could conceivably be reduced to less than the 20 microns stated to be intended. However, in accordance with the present invention it is possible to reduce these optimistic figures by at least another order of magnitude so that each sensing element has a smaller diameter than that of the electron beam. Under such conditions the resolution is not limited by the size and spacing of the dots but by the size of the electron beam.

Thus, an object of this invention is to provide a silicon image sensor of improved resolving power.

It is a further object to provide such an image sensor of increased sensitivity to visible light.

It is a further object to provide an image sensor capable of transmitting a greater quantity of information per unit area of sensor surface.

It is yet another object to provide an image sensor which is simpler to manufacture than has been the case with prior art devices.

It is yet another object to provide an image sensor which can exhibit gain or amplification due to multiplication.

These and other objects and advantages are achieved by first epitaxially depositing on a transparent substrate formed of a material such as sapphire a thin layer of silicon which may for example be N-type. There is then sputter deposited on this thin layer a film of P-type silicon. The resulting film does not conduct in the plane of the deposit but does conduct normal to it and in fact has formed on the N-type silicon an array of submicroscopic diodes each of which is dielectrically isolated from its neighbors. A plurality of gold electrodes are then deposited on the sputtered layer to form sensing elements. The gold overlay serves to contact bundles of these submicroscopic diodes. This overlay can be a pattern of dots or squares, or if it is desired to get the ultimate in resolution, it can be an island-type pattern of vacuum-deposited gold. In order to provide gain, it is merely necessary to add a layer or layers of silicon deposited by sputtering on top of the first layer. The second layer should be of conductivity type opposite to that of the first so that a plurality of submicroscopic transistors are formed. In either the two layer or multilayer version, an output electrode is provided around the edge of the device which is connected back through a load resistor to the cathode from which the electron scanning beam is derived. The optical image to be read, of course, is focused onto the outer sapphire surface through a suitable lens.

DESCRIPTION OF THE PREFERRED EMBODIMENTS

Figure 1:
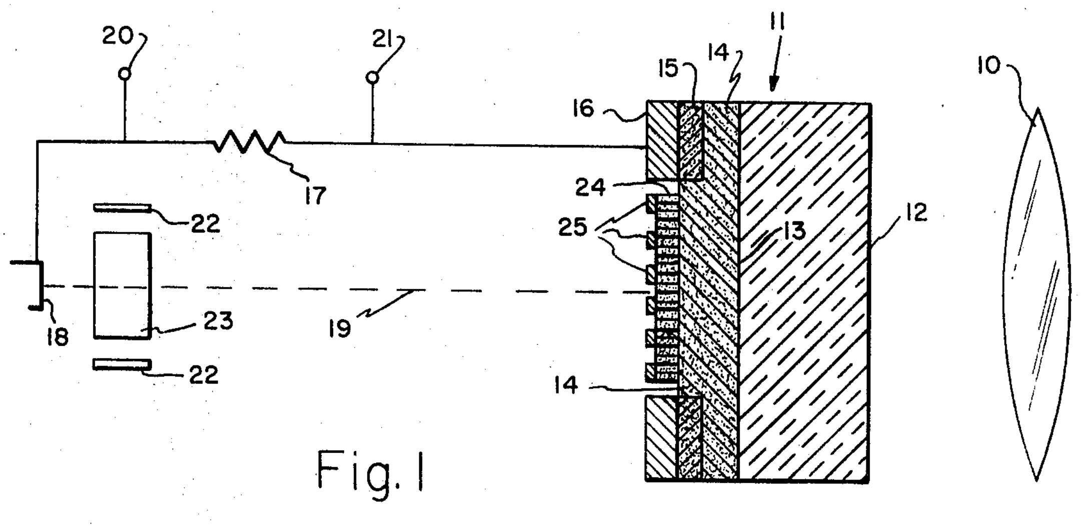
FIG. 1 is a cross-sectional view, partially schematic, of an image sensor in accordance with the present invention.

Turning now to the drawings it will be noted that identical elements shown in each of the two figures are indicated by the same reference characters. With particular reference to FIG. 1 it will be noted that a lens 10 focuses an optical image on the front surface 12 of a substrate 11 which is composed of transparent material preferably sapphire. The substrate 11 may have a square or round configuration of the front and rear surfaces and in practice would be mounted as the front element in a cathode-ray tube of conventional design.

Epitaxially deposited on the rear surface 13 of the substrate 11 is a thin layer 14 of a semiconductor such as N-type silicon. Diffused into the layer 14 is an N+ region 15 which extends peripherally around the edge of the layer and which forms a contact base for the deposited gold output electrode 16.

The output electrode 16 is connected through a load resistor or utilization device 17 to the cathode 18 of the cathode-ray tube. Cathode 18 generates a beam 19 of electrons which are used to scan the surface of the image sensor in order to provide at terminals 20 and 21 across the load resistor 17 a voltage which varies in magnitude according to the variable intensity of the light image at the point being scanned. The scanning of the beam 19 is controlled by vertical deflection plates 22 and horizontal deflection system 23 in a manner well known in the art.

In order to avoid optical distortion in transmission of the image from lens 10 through the transparent substrate 11 it is essential that both the front and back surfaces 12 and 13 of the substrate be optically flat and smooth. Such smoothing of the surfaces may be accomplished by conventional mechanical lapping and polishing or the smoothing operation may be performed in accordance with the method taught in a copending application filed by the inventor herein and assigned to the assignee herein and entitled, "Method for Smoothing the Surface of Substrates." This application was filed on Nov. 12, 1968 and was given Ser. No. 774,925. The teaching of this application indicates the possibility of using radiofrequency sputtering techniques for smoothing the surfaces of substrates. It should be pointed out, however, that this method does not form a necessary portion of the present invention and that any smoothing techniques may be used to obtain optically flat surfaces on the faces 12 and 13 of the substrate 11.

The epitaxially deposited thin layer 14 of N-type silicon which is immediately adjacent the polished surface 13 of substrate 11 is made considerably thinner than has been possible in prior art devices since it need not afford any mechanical support to the structure. The mechanical support, of course, is provided by the transparent substrate 11. Hence, the layer 14 is preferably of the order of a micron in thickness and in more general terms is preferably made to have a thickness which is less than the mean free path of photo-generated carriers which are generated by impingement of the optical image from the surface 13 of the transparent substrate onto the adjacent silicon layer 14. These carriers thus readily travel to the junctions formed on the opposite surface of layer 14 to thereby increase the sensitivity of the device.

The thinner the layer 14 is, the greater is the percentage of carriers generated beneath the surface 13 per microwatt per square centimeter of incident light thereon which will reach the PN junction. This is true both because there is less opportunity in a thin layer for random directional diffusion and because with respect to those carriers which do not diffuse but rather take a straight-line path normal to the surface, a greater percentage will have sufficient energy to reach the PN junction.

These diodes are formed between the layer 14 and a sputter deposited layer 24 of P-type silicon which has been deposited onto the layer 14 in accordance with the method taught in U.S. Pat. application Ser. No. 563,482 filed July 5, 1966, now U.S. Pat. No. 3,463,715 by the present inventor and assigned to the same assignee as is the present application. The previous application is entitled, "Method of Depositing Semiconductor Material" and discloses the fact that sputter-deposited semiconductor material will initially form a layer of material having a very high sheet resistance. Such a layer in fact comprises a large plurality of submicroscopic diodes each separated by an insulating barrier of silicon dioxide. The previous application discloses not only how such a layer can be deposited but also how its sheet resistance can be reduced if desired. For the purposes of forming the type of diodes we are now considering the step of heating this layer in a hydrogen atmosphere to reduce sheet resistance would of course not be taken since it is desired to retain the plurality of diodes which are initially formed as taught therein.

Figure 2:
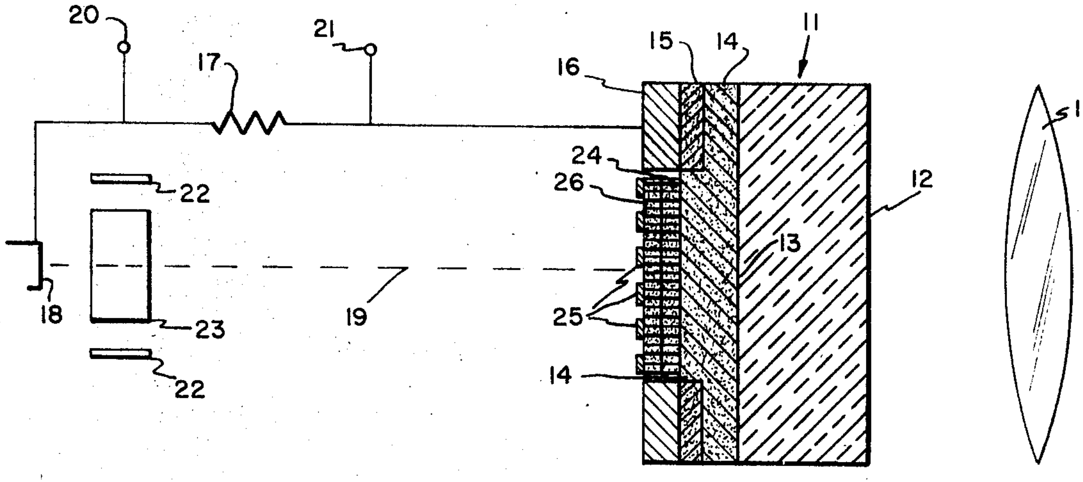
FIG. 2 is a view similar to FIG. 1 but showing a second embodiment of the sensor in which multiple-sputtered layers are used in order to provide gain.

A plurality of gold overlay contacts or electrodes such as the electrodes 25 is deposited over the sputter-deposited layer or layers. It should be noted, for example, that in FIG. 1 there is a single sputter deposited layer 24 of P-type material whereas in FIG. 2 there is the same P-type layer 24 and on top of it a second N-type layer 26 is sputter deposited prior to depositing the gold contacts 25. The layer 26 is deposited in the same manner the layer 24 is and serves to provide the device with gain or amplification resulting from the NPN sandwich. In all other respects the devices of FIGS. 1 and 2 are identical.

This NPN sandwich layer forms an array of submicroscopic dielectrically isolated phototransistors rather than the array of photodiodes formed in the device of FIG. 1. The layer 14 here serves as a common base for each of these phototransistors. The photogenerated carriers resulting from light falling on layer 14 produce transistor action by their effect on the base-emitter junction formed between layers 14 and 24. Of course, the only transistors which will conduct are those on which the electron beam 19 is falling at any given time.

The gold electrodes 25 may be evaporated through a mesh mask in conventional fashion or they may be formed in accordance with the method of forming the island-type deposits shown in FIG. 1 of U.S. Pat. No. 3,355,320 issued on Nov. 28, 1967, to R. S. Spriggs et al. The ultimate intended product of the Spriggs method is a meshlike resistive film, but the first step in forming this film is applicable to providing a method of forming small island contacts such as are desired herein. The Spriggs method depends upon agglomeration taking place during vacuum deposition in films typically having a thickness between a few hundred angstrom units and a few microns. As pointed out in the Spriggs patent, the tendency of the material to form agglomerates is directly related to the difference between its melting point temperature and the temperature of the substrate on which it is deposited. Since gold has a relatively high melting point, it will tend to form continuous films if it is deposited at or near room temperature and if it is desired to use gold for electrodes 25 formed by this process the substrate must be heated during the deposition process. Alternatively, materials which have been taught by Spriggs to readily agglomerate at or near room temperature include indium and tin either of which are suitable as a substitute for gold in forming the island deposits. Using the Spriggs method it has shown that it is possible to obtain agglomerates or islands having dimensions as small as 10 to 100 angstrom units.

This dimension range of 10 to 100 angstrom units (10$^{19}$to 10$^{18}$ meters) is less than the diameter of presently attainable electron beams. It follows that the device disclosed herein is limited in its resolution not by the individual sensing elements which may be reduced in size to less than 100 angstrom units, but by the attainable minimum diameter of the electron beam. Such an increase in resolution permits the storing or readout of considerably greater amounts of digital information where the image being sensed is digital in nature and results in much greater resolution of detail where a continuous gray scale reading is being used to provide an image in the photographic or television sense. Also, the very thin layer 14 results in much greater sensitivity then is heretofore been available since the photoelectrons are not dissipated in this layer to the extent that they have been in previous devices but have a more immediate effect upon the photo junction. Furthermore, if a device of the type shown in FIG. 2 is used it is possible to further increase this sensitivity of the device by virtue of the gain inherent in the NPN sandwich structure.

It is thus seen that the use of a transparent substrate such as the sapphire substrate 11 on which a layer of silicon such as the layer 14 has been epitaxially deposited provides a device of greater resolving power and sensitivity than has heretofore been available. The use of even a single layer of sputter-deposited silicon together with the very fine electrode structure permits a considerable increase in the degree of resolution obtainable in the image sensor. Furthermore, this resolution may be retained and the sensitivity even further increased where multiplication is achieved by using the NPN sandwich type of structure illustrated in FIG. 2.

While a specific preferred embodiment of the invention has been described by way of illustration only, it will be understood that the invention is capable of many other specific embodiments and modifications and is defined solely by the following claims.

What I claim is:

1. An image sensor comprising:
a substrate of optically transparent material having first and second opposed surfaces for transmitting to said second surface an optical image incident on said first surface;
a layer of semiconductor material of a first conductivity type on said second surface of said substrate, said semiconductor material having a thickness not greater than 1 micron;
a sputter deposited film of said semiconductor material of a second conductivity type on said layer, said sputter deposited film being nonconductive in the plane of the layer but conductive in a direction normal to said plane;
electrodes on said film for conducting in said direction normal to said plane; and
output electrode means in ohmic contact with said semiconductor layer.

2. An image sensor as in claim 1 wherein said substrate material is sapphire.

3. An image sensor as in claim 1 wherein said semiconductor material is silicon.

4. An image sensor comprising:
a substrate of optically transparent material having first and second opposed surfaces for transmitting to said second surface an optical image incident on said first surface;
a layer of semiconductor material of a first conductivity type deposited on said second surface of said substrate, said semiconductor material having a thickness not greater than one micron;

a first sputter-deposited film of semiconductor material of a second conductivity type opposite to said first type on said layer, said sputter-deposited film being nonconductive in the plane parallel to said layer but conductive in a direction normal to said plane;

a second sputter-deposited film of semiconductor material of said first conductivity type on said first sputter-deposited film, said second sputter-deposited film also being nonconductive in the plane parallel to said layer but conductive in a direction normal to said plane;

electrode means on said second film for conducting in said direction normal to said plane; and output electrode means in ohmic contact with said semiconductor layer.

5. An image sensor as in claim 4 wherein said substrate material is sapphire.

6. An image sensor as in claim 4 wherein said semiconductor material is silicon.

UNITED STATES PATENT OFFICE

CERTIFICATE OF CORRECTION

Patent No. 3,599,055 Dated August 10, 1971

Inventor(s) Murray Bloom

It is certified that error appears in the above-identified patent and that said Letters Patent are hereby corrected as shown below:

Cover Page, in the title "SILICONE" should read --SILICON--

Column 1, in the title "SILICONE" should read --SILICON--

Column 4, lines 12 and 13 "$10^{19}$ to $10^{18}$" should read --$10^{-9}$ to $10^{-8}$--

Signed and sealed this 28th day of March 1972.

(SEAL)
Attest:

EDWARD M.FLETCHER,JR.
Attesting Officer

ROBERT GOTTSCHALK
Commissioner of Patents